United States Patent [19]

Genest

[11] Patent Number: 4,711,995

[45] Date of Patent: Dec. 8, 1987

[54] ELECTRONIC KEY CODE RECORDING DEVICE

[76] Inventor: Leonard J. Genest, 1331 E. Edinger St., Santa Ana, Calif. 92705

[21] Appl. No.: 884,132

[22] Filed: Jul. 10, 1986

[51] Int. Cl.[4] .............................................. G06K 7/08
[52] U.S. Cl. .................................... 235/449; 235/382; 235/454
[58] Field of Search ........................ 235/382, 449, 454

[56] References Cited

U.S. PATENT DOCUMENTS 3,749,889  7/1973  Vaskunas ........................... 235/449

Primary Examiner—Harold I. Pitts
Attorney, Agent, or Firm—Nilsson, Robbins, Dalgarn, Berliner, Carson & Wurst

[57] ABSTRACT

A first transparent strip having a series of alternate lines and spaces is mounted in a housing parallel and adjacent to a second transparent strip having a series of lines and spaces. A key inserted through a slot formed in the housing pushes the second transparent strip across the first transparent material. Photo emitters mounted in the housing emit light onto the first and second transparent strips. By moving the series of alternate lines and spaces on the strips with respect to each other, the intensity of transmitted light changes. Photo detectors mounted in the housing detect the light transmitted through the first and second transparent strips. Thus, a clock signal is generated as a function of actual distance moved by the second transparent strip. A magnetic head is mounted in the housing near the slot. The clock signal is applied to a circuitry that drives the magnetic head to enable the magnetic head to record a code on the key that is synchronous with the lines on the transparent strip. Since the key moves the second transparent material as the key moves past the magnetic head, the code is recorded on the key as a function of distance moved by the key past the magnetic head.

8 Claims, 4 Drawing Figures

ELECTRONIC KEY CODE RECORDING DEVICE

BACKGROUND OF THE INVENTION

The present invention relates to recording a code on a key which is used in electronic locks and, more particularly, is concerned with utilizing two Moire fringe pattern film strips and two photodetector and photoemitter pairs to produce a clock signal for periodically generating a recording pulse as a function of actual distance moved by the key over a permanently positioned magnetic head.

There are many devices for recording a code on a key which is used in electronic locks. Typically, the key is inserted into a slot and a magnetic head is moved linearly along the length of the key while the magnetic head records the code on the key.

There are many methods for recording the code on the key. One method uses pulse width modulation while another method records pulses along one track which, represents binary zero (0), and records pulses on another track, which represents binary one (1). The method which uses two tracks representing 0 and 1 is known as the dual track code method.

The code is recorded on a magnetic strip laminated to the key. When the key is fully inserted in the recording device the magnetic head moves across the magnetic strip and records the code. Since the key remains stationary while the magnetic head moves across the magnetic strip, the speed of the magnetic head is important. The accuracy of the magnetic head movement requires a drive motor, motor drive circuitry to control the speed of the motor, means for generating rotary optical pulses to measure the speed of the motor, and many other supporting elements. A recording device which uses movement of the magnetic head to record the code is usually expensive and, due to the many parts required by the device, is complicated and susceptible to many problems such as motor noise, gear backlash and gear noise.

A simpler, lower cost and more efficient recording device would permanently position the magnetic head near the entrance of the slot. When the key is inserted at the entrance of the slot and the key can pass over or under the magnetic head and the magnetic head could record the code as a function of actual distance moved by the key relative to the stationary magnetic head. A device of this type would eliminate many expensive parts and decrease the complexity of the device, thereby decreasing the susceptibility to problems.

SUMMARY OF THE INVENTION

A device for recording a code on a key for electronic locks includes a housing having an opening for receiving the key. A first transparent material having a series of alternate lines and spaces is mounted in a stationary position in the housing. A second transparent material having a series of alternate lines and spaces is mounted adjacent and parallel to the first transparent material. When the key is inserted through the opening, the second transparent material is adapted to be moved by the key with respect to the first transparent material. Means are provided for recording the code on the key as a function of distance traveled by the key with respect to the magnetic head as the key is inserted through the opening.

BRIEF DESCRIPTION OF THE DRAWINGS

The invention will be better understood from the following detailed description thereof taken in conjunction with the accompanying drawings, in which.

DETAILED DESCRIPTION OF THE PREFERRED EMBODIMENT

Figure 1:
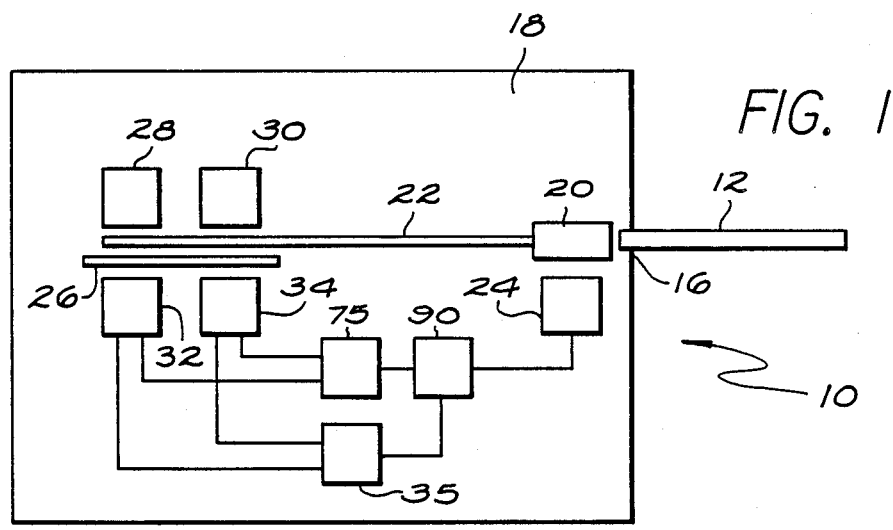
FIG. 1 is a schematic side view of the present invention.

FIG. 1 is a schematic of a device for recording a code on a key 12 which is used for electronic locks. The code is recorded on a magnetic strip 14 (FIG. 2) laminated to the key 12. The code may be recorded on the key by methods such as pulse width modulation dual track code, or other recording formats.

The key 12 is inserted in a key entrance slot 16 formed in a housing 18. When the key 12 is inserted in the slot entrance 16, the key 12 pushes a plunger 20. A movable film strip 22 is fixed to the plunger 20. Thus, when the plunger 20 moves under the force of the key 12, the movable film strip 22 also moves. A magnetic read/write head 24 is permanently mounted in the housing 18 near the slot entrance 16.

The magnetic head 24 records the code on the magnetic strip as the key 12 passes over the magnetic head 24 and moves further into the housing 18. Furthermore, the head 24 reads the code for verification when the key is removed from the slot entrance 16. Positioning the magnetic head 24 below the path of the key 12 is not essential. However, the magnetic head 24 must be permanently positioned in the housing 18 such that when the key 12 moves further into the housing 18, the magnetic strip 14 faces and moves past the magnetic head 24. The movable film strip 22 moves over a stationary film strip 26 positioned parallel and adjacent to the path of the movable film strip 22.

A first and second photo emitter 28 and 30 are mounted in the housing adjacent to one another and facing the movable film strip 22. A first and second photo detector 32 and 34 also are mounted in the housing 18 adjacent to one another and facing the stationary film strip 26. The first and second photo emitters 28 and 30 emit light on the movable film strip 22. The light transmitted through the movable film strip 22 and stationary film strip 26 is sensed by the first and second photo detectors 32 and 34, respectively.

Figure 2:
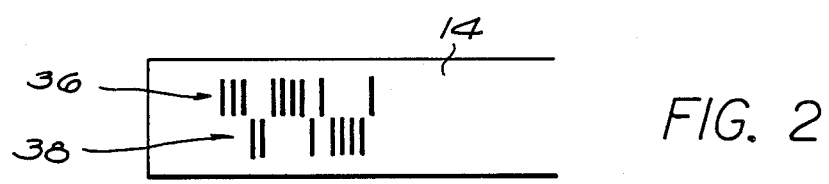
FIG. 2 shows a typical dual track code recorded on the magnetic strip on the key.

To illustrate the present invention by way of an example, the code recorded on the magnetic strip 14 utilizes the dual track code format whereby all the "0" bits are recorded on a first track 36 and all the "1" bits are recorded on a second track 38, as is shown in FIG. 2.

Figure 3:
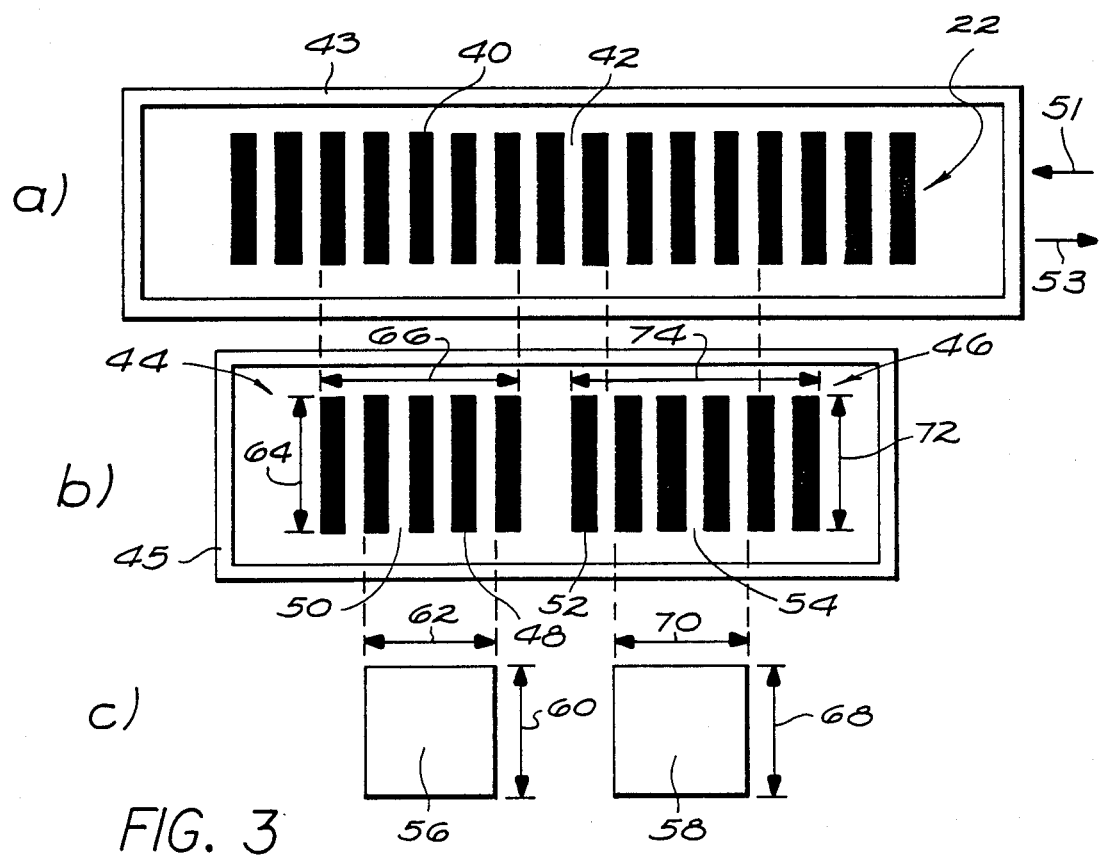
FIG. 3 shows the lines and spaces of the two transparent materials of the present invention, and the relative positions of the areas scanned by the two photodetectors.

The movable film strip 22 is made of a transparent type of material with a series of alternate opaque lines 40 and transparent spaces 42, as is shown in FIG. 3a. Although lines 40 and spaces 42 can have any width and height, in the example embodiment they are 4 mils wide (1 mil equals 1/1000 of an inch) and about 0.5 inches high. Referring to FIG. 3b, the stationary film strip 26 is also made of a transparent type of material and also has a series of alternate opaque lines and transparent spaces. However, the lines and spaces of the stationary film strip 26 are separated into a first section 44 and a second section 46. The stationary film strip's first section 44 includes opaque lines 48 having the same width as lines 40 and transparent spaces 50 having the same width as spaces 42. The stationary film strip's second section 46 includes opaque lines 52 having the same width as lines 40 and 48, and transparent spaces 54 having the same width as spaces 42 and 50. The first photo detector 32 is positioned under the first section 44 of the stationary film strip 26 while the second photo detector 34 is positioned under the second section 46 of the stationary film strip 26.

As the movable film strip 22 moves across the stationary film strip 26, the positions of lines 48 and 52 over lines 40, and spaces 50 and 54 over spaces 42 will vary. The movable film strip 22 is positioned approximately 15/20,000 of an inch from the stationary film strip 26. When the movable film strip 22 is positioned over the stationary film strip 26 such that lines 48 of the first section 44 are directly over spaces 42 and the spaces 50 are directly over lines 40, the entire area encompassed by the first section 44 is essentially opaque to the first photo detector 32. Thus, the first section 44 will absorb all the light emitted by the first photo emitter 28 and no light is transmitted through the movable film strip 22 and the first stationary section 44. The transmittable quality of the two film strips when there is no light transmitted is 0% (zero percent) transmittable.

When the movable film strip 22 is positioned over the first section 44 such that lines 40 are directly over lines 48, and spaces 42 are directly over spaces 50, approximately half the entire area encompassed by the first section 44 is essentially opaque to the first photo detector 32. Thus, the movable film strip 22 and the first section 44 of the stationary film strip 26 will absorb approximately half the light emitted by the first photo emitter 28. Therefore, approximately half the emitted light is transmitted through the plunger film strip 22 and the first section 44. The transmittable quality of the two film strips when half the emitted light is transmitted is 50% (fifty percent) transmittable.

Figure 4:
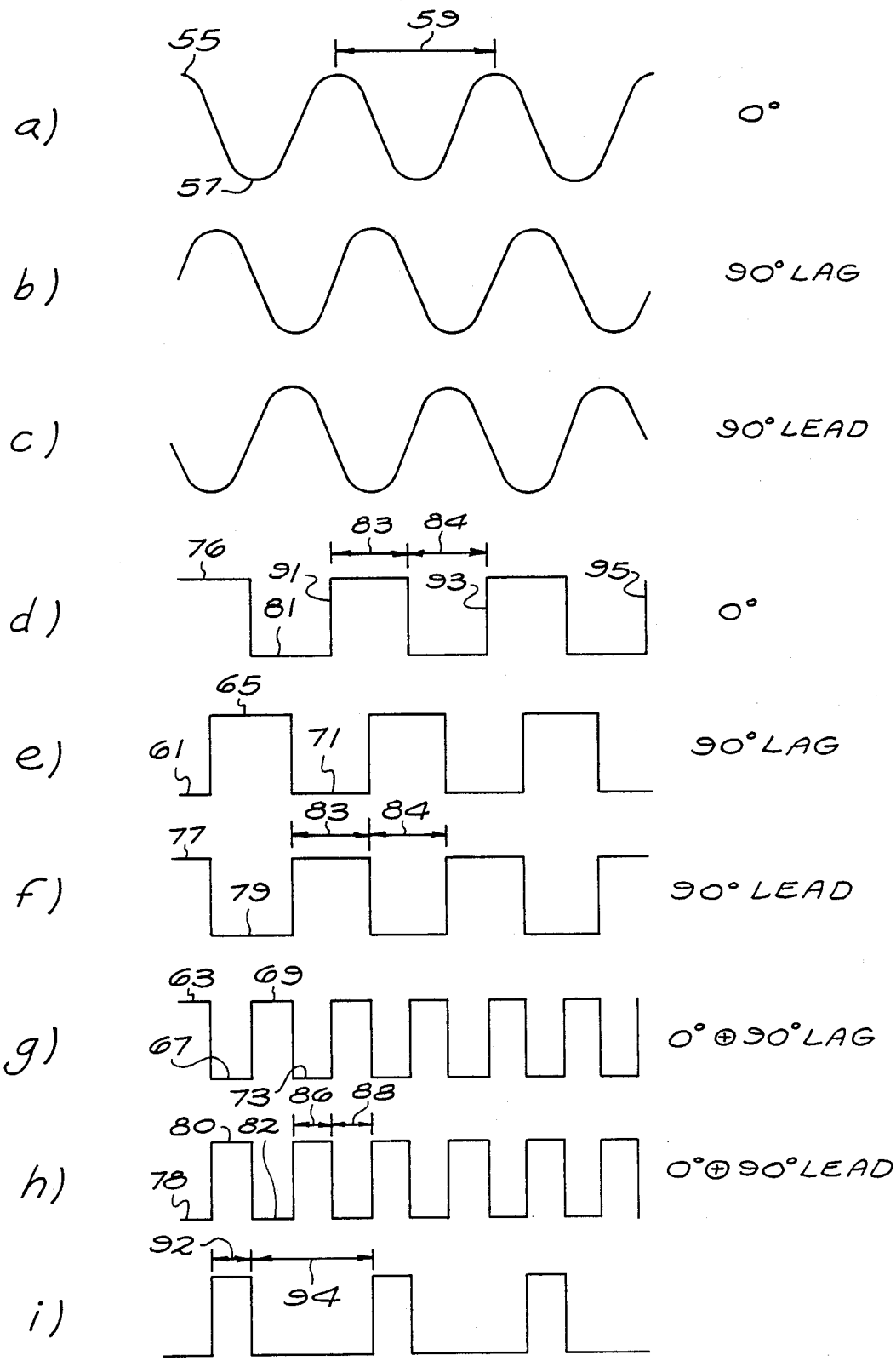
FIG. 4 shows the resulting signals generated by the two photodetectors, the amplification of the signals, the output of an exclusive-or circuit and the output of the microprocessor.

Referring to FIG. 3c, the stationary film strip 26 is positioned such that the entire area 56 scanned by the first photo detector 32 is covered by the first section 44 of the stationary film strip 26. To provide the optimal signal, movable film strip 22 is positioned approximately 15/20,000 of an inch above the stationary film strip 26. A signal can still be generated at a greater distance. However, the signal will decrease as the movable film strip 22 is placed farther from the stationary film strip 26. As the first photo emitter 28 emits a light onto the movable film strip 22, the light is transmitted through the movable film strip 22 and through the first section 44 of the stationary film strip 26 and is sensed by the first photo detector 32. The signal generated by the first photo detector 32, as a result of the scanned transmitted light, is shown in FIG. 4a. The peak value 55 of the sinusoidal signal indicates 50% light transmittable and the low value 57 indicates 0% light transmittable. The distance 59 between any two peak values 55 is 0.008 inches of movement by the movable film strip 22.

The second photo emitter 30 and second photo detector 34 are positioned such that the entire area 58 scanned by the second photo detector 34 is within the second section 46 of the stationary film strip 26. Furthermore, lines 52 of the stationary second section 46 are positioned to cover exactly half of a line 40 on the movable strip 22 and exactly half of a space 42, when the lines 48 and spaces 50 of the first section 44 are exactly aligned with the lines 40 and spaces 42, respectively. Thus, the signals from the first photo detector 32 and second photo detector 34 are 90° out of phase. However, if the first film strip 22 moves in direction 51, the signal generated by the second photo detector 34 is also sinusoidal (FIG. 4b), and lags the signal generated by the first photo detector 32 by 90°. If the first film strip 22 moves in direction 53, the signal generated by the second photo detector 34 is also sinusoidal (FIG. 4c), and leads the signal generated by the first photo detector 32 by 90°. The first film strip 22 and plunger 20 move in direction 53 when the key 12 is removed from the slot 16. There are many ways to move the first film strip 22 and plunger 20 in direction 53 as is known by those skilled in the art. The distance between peak values is the same for the signal generated by the first photo detector 32, that is, 0.008 inches of movement by the film strip 22.

The length 60 and width 62 of the area 56 scanned by the first photo detector 32 must not be more than the length 64 and width 66 of the first section 44, respectively, to allow the first photo detector 32 to scan the change of transmitted light through the movable film strip 22 and the first stationary section 44. Also, the length 68 and width 70 of the area 58 scanned by the second photo detector 34 must be no more than the length 72 and width 74 of the second stationary section 46, to allow the second photo detector 58 to scan the change of transmitted light through the movable film strip 22 and the second stationary section 46.

As stated above, the movable film strip 22 and the stationary film strip 26 must be positioned such that when the lines 48 and spaces 50 of the first section 44 are aligned directly over the lines 40 and spaces 42 of the movable film strip 22, lines 52 and spaces 54 of the second section 46 are aligned over half a line 40 and half a space 42. If there is any variance, the signals generated by the first photo detector 32 and second photo detector 34 will not be 90° out of phase. The long movable film strip 22 is mounted in a metal frame 43 while the stationary film strip 26 is mounted in an adjustable metal frame 45. The adjustable metal frame 45 allows the stationary film strip 26 to be initially aligned. The initial alignment between the movable film strip 22 and stationary film strip 26 is made by adjusting a single screw adjustment (not shown).

The sinusoidal signal generated by the first photo detector 32 is amplified and shaped so that a square wave is generated as is shown in FIG. 4d. The sinusoidal signal generated by the second photo detector 34 is also amplified so that a square wave is generated. When the first film strip 22 moves in direction 51, the square wave generated is shown in FIG. 4e and lags the signal generated by the first photo detector 32 by 90°. When the first film strip 22 moves in direction 53, the square wave generated is shown in FIG. 4f and leads the signal generated by the first photo detector 32 by 90°. The amplified signals generated by first photo detector 32 and second photo detector 34 are input into an exclusive-or circuit 75 (FIG. 1) to double the frequency. An exclusive-or circuit is constructed so that its output will be low (0) if the inputs are the same, and the output will be high (1) if the inputs are different. By applying the square wave as shown in FIG. 4e or 4f to one input of the exclusive-or circuit 75 and applying the square wave signal shown in FIG. 4d to the other input of the exclusive-or circuit, the resulting output signal generated by the exclusive-or circuit is shown in FIG. 4g or 4h.

The input signal to the exclusive-or circuit in FIG. 4d begins high 76, while the input signal to the exclusive-or circuit in FIG. 4e begins low 61.

Since these signals begin differently, the output signal of the exclusive-or circuit, FIG. 4g, will be high 63. The signals in FIG. 4e changes to high 65 while the signal in FIG. 4d remains high 76. Therefore, the input signals are the same and the output signal of the exclusive-or circuit, FIG. 4g, changes to low 67. The signal in FIG. 4d then changes to low 81 while the signal in FIG. 4e remains high 65. Therefore, the input signals are again different and the output signal of the exclusive-or circuit, FIG. 4g, will be high 69. The signal in FIG. 4e then changes to low 71 while the signal in FIG. 4d remains low 81. Therefore, the input signals are again the same and the output signal of the exclusive-or circuit, FIG. 4g, will be low 73. This process continues until either input is terminated.

The square wave in FIG. 4d begins high as shown at 76, while the square wave in FIG. 4f also begins high as shown at 77. Since the signals begin the same, the exclusive-or circuit's output signal, as shown in FIG. 4h, begins low as shown at 78. The signal from the second photo detector 34 changes to low as shown at 79, while the signal from the first photo detector 32 remains high as shown at 76. Therefore, the input signals to the exclusive-or circuit 75 are different and the output signal changes to high as shown at 80. The input signal from the first photo detector 32 then changes to low as shown at 81 while the input signal from the second photo detector 34 remains low as shown at 79. Therefore, the input signals to the exclusive-or circuit 75 are the same and the output signal will change to low as shown at 82. This process continues until either input signal is terminated. The output signal from the exclusive-or circuit is a square wave having twice the frequency of the signals generated from the first photo detector 32 or the second photo detector 34.

The signals generated by the first photo detector 32 and second photo detector 34 are a function of distance traveled by the movable film strip 22 over the stationary film strip 26 and not as a function of time.

Referring to FIGS. 4g and 4h, the frequency of each signal is double the frequency of either input signal. However, there is a phase difference of 180 degrees. Thus, by applying the signal generated by the first photo detector 32 to one input of the exclusive-or circuit and the signal generated by the second photo detector 34 to the other input, the output signal generated has double the frequency of the input signal (2 mils), thus providing a positive clock pulse for every 2 mils movement of the first film strip 22 over the second film strip 26.

Additionally, if the signal generated by the first and second photo detectors 32 and 34 are applied to a JK flip flop 35, the direction of key travel can be determined. The flip flop is constructed such that if the "J" input and "K" input are different, the output signal will be low (0) if the "J" input is low and the output signal will be high (1) if the "J" input is high. Additionally, the JK flop flop is positive edge triggered. Thus, at every positive edge of the clock signal, the output of the flip flop will change its state to the state of the "J" input. The signal generated by the first photo detector 32 is used as the clock input to the flip flop, and the signal generated by second photo detector 34 is applied to the "J" input. Additionally, the signal generated by second photo detector 34 is inverted and applied to the "K" input of the flip flop. Therefore, the input to the flip flop will always be opposite each other. Thus, the signal applied to the clock input of the JK flip flop is shown in FIG. 4d. The positive edges of this signal are shown as 91, 93 and 95. If the key pushes the first film strip 22 in direction 51, the signal applied to the "J" input of the flip flop will be that as shown in FIG. 4e and it can be seen that for every occurrence of a positive edge of the signal in FIG. 4d, the signal in FIG. 4e is low and, therefore, the output of the flip flop will be low. If first film strip 22 moves in direction 53, the signal as shown in FIG. 4c will be applied to the "J" input of the flip flop and it can be seen that for every positive edge of the signal in FIG. 4d, the signal in FIG. 4f is always high and, therefore, the output of the flip flop will also be high. Thus, if the key is being inserted thereby moving the first film strip 22, the output of the flip flop will be low and if the key is being removed thereby enabling the first film strip 22 to move in direction 53, the output of the flip flop will be high thus indicating the direction of travel by the key and first film strip 22.

If the clock signal as shown in FIG. 4g or 4h is applied to the magnetic head and is used to generate the recording pulse signal which records the code on the key, each recording pulse will be 2 mils and the distance between recording pulses will be 2 mils. However, it is desirable that distance between recording pulses be greater. Therefore, a microprocessor 90, shown in FIG. 1, is coupled between the exclusive-or circuit 75 and the magnetic head 24. The microprocessor 90 generates a recording pulse for every other positive clock pulse of the output signal from the exclusive-or circuit 75. Therefore, the recording pulse signal will appear as shown in FIG. 4i, where a recording pulse duration as shown at 92 is 2 mils while the distance between recording pulses as shown at 94 is 6 mils.

Although the microprocessor 90 has been described to only modify the signal from the exclusive-or circuit 75, it performs other functions such as determining whether the magnetic head 24 should read or write depending on the direction of movement of the first film strip 22. Since the magnetic head 24 reads the code on the key in the reverse order the code was encoded on the key, the microprocessor also verifies the code on the key. Additionally, the amplifier which shapes the sinusoidal signals from the first photo detector 32 and second photo detector 34, and the exclusive-or circuit 75, may be incorporated in the microprocessor 90.

If the magnetic head 24 records the code by using the dual track format, magnetic head 24 will use the recording pulse signal as shown in FIG. 4i to record pulses having the same width as the recording pulse duration as shown at 92 on either the 0 track 36 or 1 track 38. The magnetic head 24 will record only a pulse on either the 0 track 36 or the 1 track 38 but not both. Since the distance between recording pulses as shown at 94 in FIG. 4f is 6 mils, the distance between pulses recorded on either the 0 track 36 or the 1 track 38 is also 6 mils.

Since the recording pulses are generated by clock pulses which are generated by the movement of the movable film strip 22 over the stationary film strip 26, and the movable film strip 22 moves by the key 12 pushing the plunger 20, the recording pulse is essentially generated as a function of distance traveled by the key 12 over the magnetic head 24 and not by speed or acceleration of the magnetic head or the speed of the card insertion. Since the magnetic head 24 in the present invention is permanently positioned in the housing 18, many parts, such as the motor and a motor drive circuitry, are eliminated thereby simplifying and decreasing the cost of such a device.

From the foregoing it has been shown that the invention records a code on a key as a function of distance traveled by the key past a permanently positioned magnetic head as the key is inserted in the device. Although a specific embodiment of the invention has been illustrated and described, various modifications and changes may be made without departing from the spirit and scope of the invention. For example, the dimensions specified are to only illustrate an example and does not yield a superior result over other dimensions. The number of pulses or bits encoded on the magnetic strip per a unit length is the recording density. If the recording density is low, the line and space widths could be reduced to eliminate the need to double the frequency of the signals generated by the photo detectors. Therefore, the exclusive-or circuit may be eliminated. Although the photo detectors detect the light transmitted through the two film strips, a reflective material may be placed directly under the stationary film strip and the photo detectors may be positioned near the photo emitters and detect the light reflected back through the two film strips. The dimensions of the lines and spaces of the two film strips may be altered to eliminate one photo emitter and one photo detector.

What is claimed is:

1. A device for recording a code on a key which is used for electronic locks, the recording device comprising:
    a housing having an opening for receiving the key;
    a first trasparent material having a series of alternate opaque lines and transparent spaces, said first transparent material being stationary in said housing;
    a second transparent material having a series of alternate opaque lines and transparent spaces, said second transparent material being adjacent and parallel to said first transparent material, said second transparent material being adapted to be moved with respect to said first transparent material by the insertion of the key through said opening; and
    means for recording the code on the key as a function of distance traveled by the key as the key is inserted through said opening, said recording means being permanently positioned in said housing.

2. The code recording device as defined in claim 1 wherein said lines and spaces of said first transparent material and said second transparent material have equal widths.

3. The code recording device as defined in claim 2 further comprising a clock pulse generating means including:
    a photoemitter mounted in said housing such that it emits a light on said second transparent material; and
    a photodetector mounted in said housing such that it detects said emitted light which is transmitted through said first transparent material and second transparent material as said second transparent material moves.

4. A device for recording a code on a key which is used for electronic locks, the recording device comprising:
    a housing having an opening for receiving the key;
    a first transparent film strip having a series of alternate lines and spaces, said first transparent material being stationary in said housing;
    a second transparent film strip having a series of alternate lines and spaces having the same height and width as said lines and spaces of said first film, said second film being adjacent and parallel to said first film;
    a plunger shaft attached to said second film for enabling the key to move said second film across said first film when the key is inserted through said opening;
    a first photoemitter and a first photodetector mounted in said housing for generating a first signal, said first photoemitter emitting a light on said second film and said first photodetector detecting said emitted light which is transmitted through said first film and said second film as said second film moves;
    a magnetic head for recording the code on the key, said magnetic head being permanently positioned in said housing, near said opening; and
    said magnetic head using said first signal for recording the code on the key as a function of distance traveled by the key with respect to said magnetic head as the key is inserted through said opening.

5. The code recording device as defined in claim 4 further comprising:
    a second photoemitter and a second photodetector mounted in said housing for generating a second signal, said second photoemitter emitting a light on said second film and said second photodetector detecting said emitted light which is transmitted through said first film and said second film as said second film moves.

6. The code recording device as defined in claim 5 wherein:
    said second signal has the same frequency as said first signal, but is shifted ninety degrees (90°) from said first signal.

7. A device for recording a code on a key which is used for electronic locks, the recording device comprising:
    a housing having an opening for receiving the key;
    a first transparent film strip mounted in an adjustable frame which is in a stationary position in said housing, said first film having first and second sections each having a series of alternate lines and spaces;
    a second transparent film strip mounted in a frame, said second film being over, adjacent and parallel to said first film;
    said second film having a series of alternate lines and spaces which have the same width and height as said lines and spaces of said first film;
    said second film is positioned over said first film such that when said first section lines are directly over said second film lines, said second section lines are directly over exactly half of said second film lines and exactly half of said second film spaces;
    a plunger shaft attached to said second film for enabling the key to move said second film over said first film when the key is inserted through said housing opening;

a first photoemitter and a first photodetector mounted in said housing for generating a first clock pulse, said first photoemitter emitting a light on said second film, and said first photodetector detecting the light passing through said second film and said first film's first section as said second film moves over said first film;

a second photoemitter and a second photodetector mounted in said housing for generating a second clock pulse which has the same frequency as but is shifted 90° from said first clock pulse, said second photoemitter emitting a light on said second film, and said second photodetector detecting the light passing through said second film and said first film's second section as said second film moves over said first film;

an exclusive-or circuit coupled to said first and second photodetectors for generating a third clock pulse having a frequency which is double the first or second clock pulse frequency;

a magnetic head for recording the code on the key as a function of distance traveled by the key with respect to said magnetic head;

said magnetic head being permanently mounted in said housing, near said opening; and a microprocessor coupled between said exclusive-or circuit and said magnetic head for enabling said magnetic head to generate a recording signal.

8. The code recording device as defined in claim 7 further comprising:

a JK flip-flop circuit coupled between said first and second photo detectors and said microprocessor for generating a direction signal which indicates the direction of travel of the key through said housing opening.

* * * * *

UNITED STATES PATENT AND TRADEMARK OFFICE
CERTIFICATE OF CORRECTION

PATENT NO.  :  4,711,995
DATED       :  December 8, 1987
INVENTOR(S) :  Leonard J. Genest It is certified that error appears in the above-identified patent and that said Letters Patent is hereby corrected as shown below:

Column 5, line 67 delete "flop flop", and
   insert --flip flop--

Column 7, line 40 delete "trasparent", and
   insert --transparent--

Signed and Sealed this

Tenth Day of May, 1988

Attest:

DONALD J. QUIGG

Attesting Officer

Commissioner of Patents and Trademarks